United States Patent
Vasseur et al.

(10) Patent No.: US 8,885,501 B2
(45) Date of Patent: Nov. 11, 2014

(54) REACHABILITY RATE COMPUTATION WITHOUT LINK LAYER ACKNOWLEDGMENTS

(75) Inventors: Jean-Philippe Vasseur, Saint Martin dUriage (FR); Jonathan W. Hui, Foster City, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 672 days.

(21) Appl. No.: 13/151,062

(22) Filed: Jun. 1, 2011

(65) Prior Publication Data

US 2012/0307653 A1 Dec. 6, 2012

(51) Int. Cl.
H04L 12/26 (2006.01)
H04L 12/815 (2013.01)
H04W 40/14 (2009.01)
H04L 12/801 (2013.01)
H04L 12/825 (2013.01)

(52) U.S. Cl.
CPC .............. *H04W 40/14* (2013.01); *H04L 47/22* (2013.01); *H04L 47/14* (2013.01); *H04L 47/34* (2013.01); *H04L 47/25* (2013.01); *H04L 47/193* (2013.01)
USPC .......................................................... 370/252

(58) Field of Classification Search
USPC ................................ 370/261, 401, 252; 709/223
See application file for complete search history.

(56) References Cited

U.S. PATENT DOCUMENTS

| | | | |
|---|---|---|---|
| 7,564,856 B2 | 7/2009 | Bendelac et al. | |
| 2001/0022780 A1* | 9/2001 | Mizutani et al. | 370/261 |
| 2007/0214247 A1* | 9/2007 | Yang et al. | 709/223 |
| 2008/0008201 A1* | 1/2008 | Imahase et al. | 370/401 |
| 2009/0125981 A1 | 5/2009 | Krischer et al. | |

OTHER PUBLICATIONS

Hui, et al., "RPL Option for Carrying RPL Information in Data-Plane Datagrams", IETF Internet Draft, draft-ietf-6man-rpl-option-03, Mar. 2011, pp. 1-15.
"RPL: IPv6 Routing Protocol for Low Power and Lossy Networks" <draft-ieff-roll-rpl-19> by Winter, at al. (Mar. 13, 2011 version).
"Routing Metrics used for Path Calculation in Low Power and Lossy Networks" <draft-ieff-roll-routing-metrics-19> by Vasseur, et al. (Mar. 1, 2011 version).
"RPL Objective Function 0" <draft-ietf-roll-of0-11> by Thubert (May 5, 2011 version).
"The Minimum Rank Objective Function with Hysteresis" <draft-ietf-roll-minrank-hysteresis-of-03> by O. Gnawali et al. (May 3, 2011 version).

* cited by examiner

*Primary Examiner* — Mark Rinehart
*Assistant Examiner* — Gbemileke Onamuti
(74) *Attorney, Agent, or Firm* — Parker Ibrahim & Berg LLC; James M. Behmke; Stephen D. LeBarron

(57) ABSTRACT

In one embodiment, a device in a computer network receives a particular packet associated with a transmission attempts value, the associated transmission attempts value indicative of a first number of times a transmitter has attempted to transmit the particular packet. In response, the device increases by one a stored successful attempts value stored at the device, the stored successful attempts value indicative of a second number of times the device has received the same particular packet. As such, a reachability rate of a link from the transmitter to the device may be determined based on comparing the associated transmission attempts value to the stored successful attempts value.

20 Claims, 9 Drawing Sheets

TABLE 400

| PACKET ID 410 | SUCCESSFUL ATTEMPTS 420 |
|---|---|
| "A" | 3 |
| "B" | 1 |
| ⋮ | ⋮ |

FIG. 4

REACHABILITY RATE COMPUTATION WITHOUT LINK LAYER ACKNOWLEDGMENTS

TECHNICAL FIELD

The present disclosure relates generally to computer networks, and, more particularly, to computing reachability rates between devices of computer networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. In LLNs (such as low power wireless and/or power line communication or "PLC"), nodes may discover a wireless/PLC connectivity graph by observing metrics derived from communication with neighboring nodes. One critically important metric is a reachability rate, such as an expected transmission count (ETX), generally the inverse of packet success rate. An ETX of 1 is ideal as it represents no loss, while an ETX of 2 indicates that for every transmission, one retransmission is expected (on average).

ETX has been used and is being used in a number of networks, such as those operating according to a protocol called Routing Protocol for LLNs or "RPL". RPL is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Knowledge of the ETX metric is most useful on the sending node to make informed routing decisions and appropriately compute the routing topology (e.g., the DAG built by RPL). On links that provide link-layer acknowledgements, computing ETX is trivial. The sender need only keep track of the number of packets sent and the number of acknowledgements received for those packets. Unfortunately, not all links provide link layer acknowledgment, in which case, the computation of the ETX becomes very challenging.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates an example table.

DESCRIPTION OF EXAMPLE EMBODIMENTS

Overview

Figure 1:
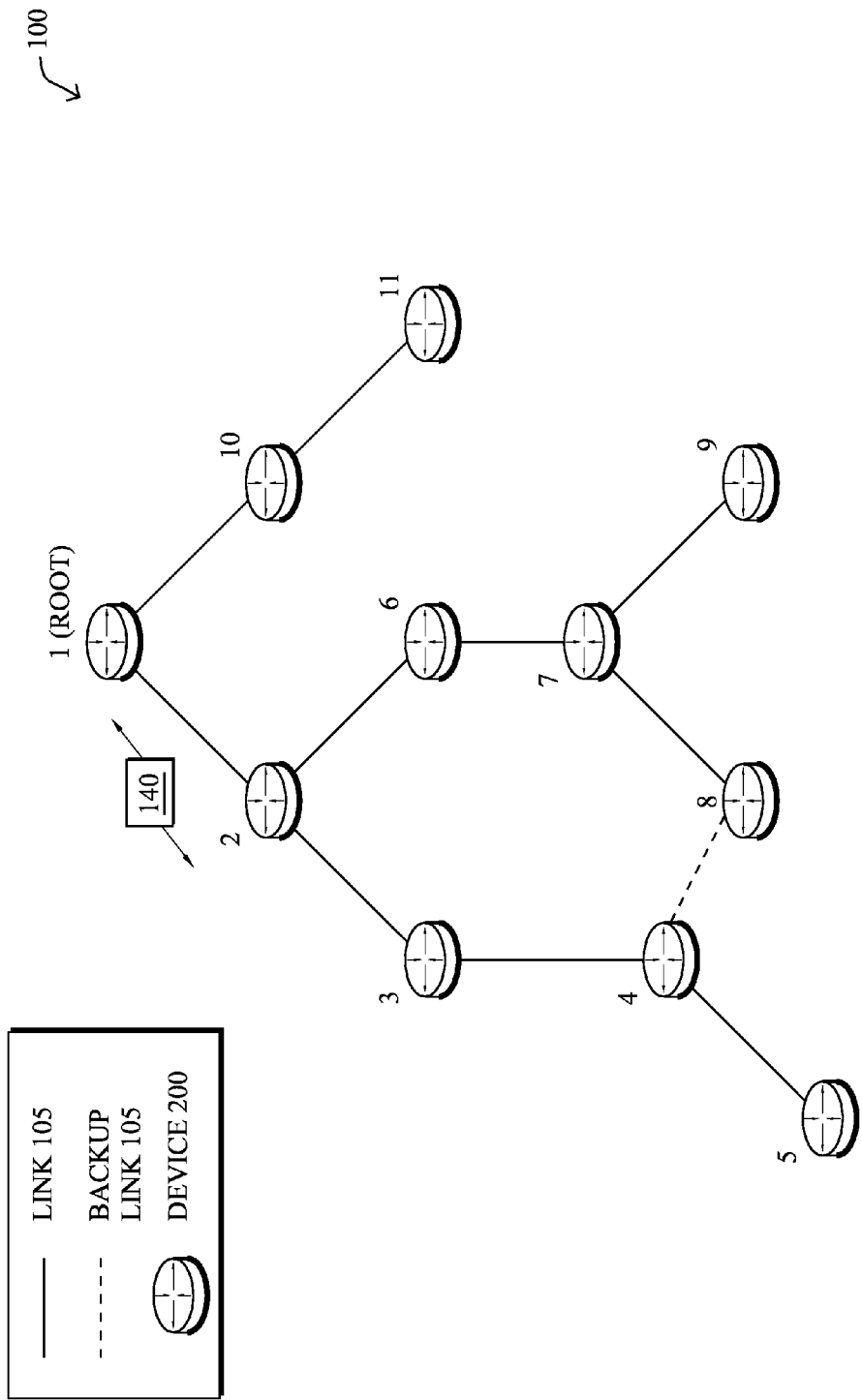
FIG. 1 illustrates an example computer network.

According to one or more embodiments of the disclosure, a device in a computer network receives a particular packet associated with a transmission attempts value, the associated transmission attempts value indicative of a first number of times a transmitter has attempted to transmit the particular packet. In response, the device increases by one a stored successful attempts value stored at the device, the stored successful attempts value indicative of a second number of times the device has received the same particular packet. As such, a reachability rate of a link from the transmitter to the device may be determined based on comparing the associated transmission attempts value to the stored successful attempts value. In one embodiment, the particular packet carries the associated transmission attempts value, and the reachability rate is determined by the receiving device. In another embodiment, the receiving device returns the stored successful attempts value to the transmitter, and the transmitter determines the reachability rate.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "1/Root", "2", "3", . . . "11", and described in FIG. 2 below) interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, while the embodiments are shown herein with reference to a generally "tree" shaped network, the description herein is not so limited, and may be applied to any type of suitable networks, such as those that have branches emitting to all directions with the root node generally centralized among a plurality of surrounding nodes.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.), PLC protocols, or other shared media protocols where appropriate. In this context, a protocol consists of a set of rules defining how the nodes interact with each other.

Figure 2:
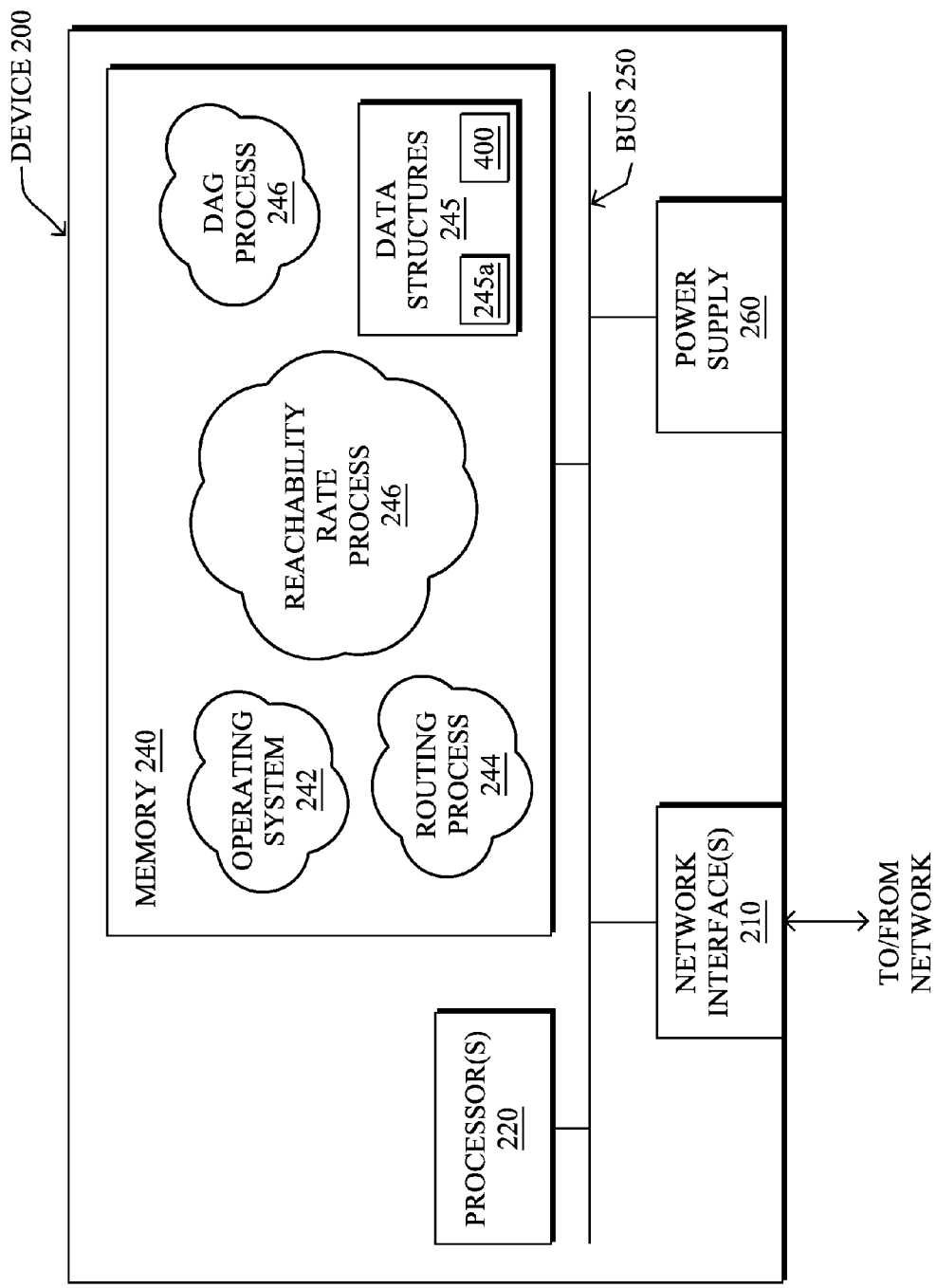
FIG. 2 illustrates an example network device/node.

FIG. 2 is a schematic block diagram of an example node/device 200 that may be used with one or more embodiments described herein, e.g., as any of nodes 1-11. The device may comprise one or more network interfaces 210 (e.g., wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246 (which may be contained within routing process 244), and an illustrative reachability rate process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intennediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" or "removed" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example OF (e.g., a default OF) may be found in an IETF Internet Draft, entitled "RPL Objective Function 0" <draft-ietf-roll-of0-11> by Thubert (May 5, 2011 version) and "The Minimum Rank Objective Function with Hysteresis" <draft-ietf-roll-minrank-hysteresis-of-03> by O. Gnawali et al. (May 3, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state.

As noted above, the ETX metric has been used and is being used in a number of networks, such as those operating according RPL. Knowledge of the ETX metric is most useful on the sending node to make informed routing decisions and appropriately compute the routing topology (e.g., appropriate parent selection in the DAG built by RPL). On links that provide link-layer acknowledgements, computing ETX is trivial. The sender need only keep track of the number of packets sent and the number of acknowledgements received for those packets. However, not all links provide link layer acknowledgment, in which case, the computation of the ETX becomes very challenging.

Said differently, computing the ETX metric becomes challenging on links that do not provide an efficient link-layer acknowledgement primitive. Existing methods may use dedicated control messages to probe the link, but such methods are relatively costly especially on low throughput links such as PLC. For example, a periodically broadcast sequence number may be used by nodes to compute loss rates, which may be included in a neighbor list in their own broadcast to communicate the ETX back to the sender. Alternatively, another technique uses explicit probe messages to determine if a neighboring node can successfully receive a message on links that do not provide link-layer acknowledgments.

Reachability Rate Computation

The techniques herein provide a mechanism that makes use of traffic flow observation, observing the number of transmission attempts on each link in order to locally compute link reachability rates (e.g., ETX) and provide that information back to the upstream neighbor in a fully dynamic fashion at very low cost. In particular, the techniques herein take advantage of the fact that even though the underlying network (e.g., LLN) does not support link layer acknowledgements, the system operates with an end-to-end acknowledgement at the application layer. That is, when the application on the originating node does not receive an acknowledgement message within a preconfigured time, it retransmits the original message. The embodiments herein thus utilize the end-to-end message flow in order to estimate link quality. It should be noted that since paths in LLN dynamically change and since traffic load over links along a given path varies, the reachability rate (e.g., ETX) of each link along a given path cannot be assumed to be the same rate as that of the overall path.

Specifically, according to one or more embodiments of the disclosure as described in detail below, a device in a computer network receives a particular packet associated with a transmission attempts value, the associated transmission attempts value indicative of a first number of times a transmitter has attempted to transmit the particular packet. In response, the device increases by one a stored successful attempts value stored at the device, the stored successful attempts value indicative of a second number of times the device has received the same particular packet. As such, a reachability rate of a link from the transmitter to the device may be determined based on comparing the associated transmission attempts value to the stored successful attempts value. In one embodiment, the particular packet carries the associated transmission attempts value, and the reachability rate is determined by the receiving device. In another embodiment, the receiving device returns the stored successful attempts value to the transmitter, and the transmitter determines the reachability rate.

Illustratively, the techniques described herein may be performed by hardware, software, and/or firmware, such as in accordance with reachability rate process 248, which may contain computer executable instructions executed by the processor 220 to perform functions relating to the novel techniques described herein. For example, the techniques herein may be treated as extensions to conventional protocols, such as the RPL protocol, and as such, would be processed by similar components understood in the art that execute the RPL protocol, accordingly.

Figure 3:
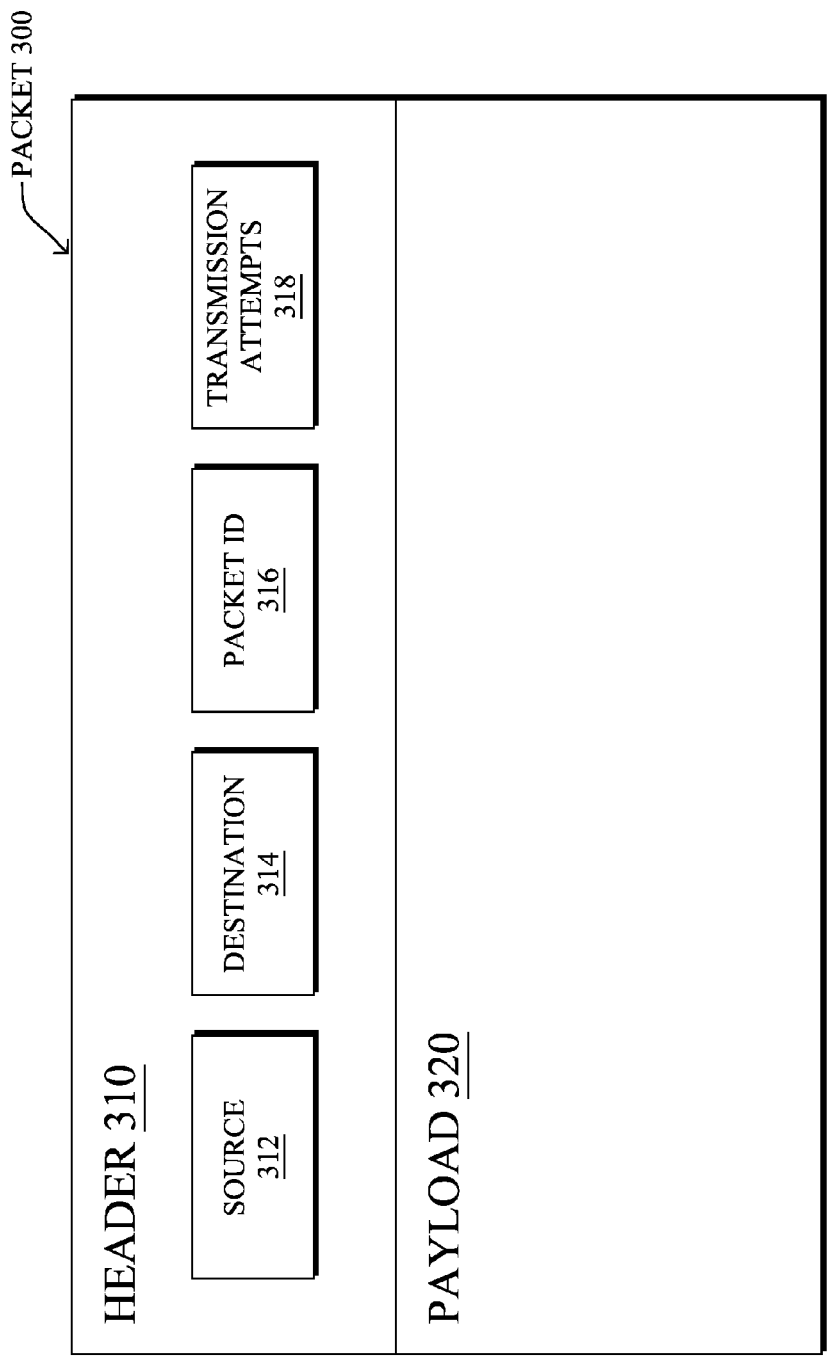
FIG. 3 illustrates an example message/packet.

Operationally, in one or more embodiments, existing user traffic flows may be examined to determine if transmission failures occur on a link. FIG. 3 illustrates an example packet 300 (e.g., 140 in FIG. 1), which may be found within a typical traffic flow. For instance, a packet 300 may generally comprise a header 310 and a payload 320. The header 310 contains information used to relay the packet, such as a source address 312 and destination address 314, as well as other information not shown for clarity, though will be understood by those skilled in the art. Also, in one or more specific embodiments described below, the packet 300 may further include additional added information, such as a packet identifier field 316 and transmission attempts value field 318. Note that one or both of these additional fields may be included in a header extension, such as an IPv6 extended header, e.g., as defined in an IETF Internet Draft, entitled "RPL Option for Carrying RPL Information in Data-Plane Datagrams" <draft-ietf-6man-rpl-option-03> by Hui, et al. (Mar. 29, 2011 version).

As illustrated in the examples below, a transmitter device, such as node 5 in FIG. 1, may transmit a particular packet 300 to a next-hop device (e.g., node 4) on its way to a destination node (e.g., node 1). The particular packet is "associated" with a transmission attempts value indicative of a number of times the transmitter has attempted to transmit the particular packet (changes hop-by-hop). As used herein, the term "associated" in this sense may imply that the packet carries the number of attempted transmissions by the forwarding devices in header field 318, or else is stored by the transmitting device (e.g., a data structure "245a"), depending upon which illustrative embodiment is implemented at the particular devices.

Upon receiving a particular packet 300, a receiving device 200 determines whether the received particular packet is the same as a previously received packet based on a packet identification. For instance, a source transmitting device (e.g., node 5) may add a packet identifier (packet-ID field 316) set by the source of the packet (does not change hop-by-hop), and as such, the receiver may check to see whether it has seen the packet ID from the source before. Alternatively, if the packet ID 316 or other explicit packet identifier value is not present, then the receiving device may compute an identification of the packet. That is, a computed identification may comprise such things as a hash result of the packet (i.e., performing a hash function on the packet), a checksum of the packet, and a direct comparison between the received particular packet and a collection of one or more previously received (and thus stored) packets. As used herein, a "packet ID" is a unique identifier of a forwarded packet, whether it is a packet ID within a field 316 added by the source or a computed identification (e.g., a hash computed by the receiving node or the packet itself).

If the packet 300 has not been received before, i.e., after determining that the received particular packet is not the same as a previously received packet, the receiving device may initialize a stored successful attempts value corresponding to the particular packet at one, the stored successful attempts value indicative of a number of times the device has successfully received the same particular packet. For example, the device may create a cache entry (e.g., with an associated/configurable timer). It should be noted that the fact that a specific node received multiple retransmits of the same packet is an indication of the fact that the node has not been successfully transmitted to its destination or alternatively that the acknowledgment ("ack") message failed to reach the sending node. If, on the other hand, the packet has been received before, the receiving device may update the stored successful attempts value corresponding to the particular packet, i.e., incrementing it by one, and may also reset any cache entry timers, accordingly. FIG. 4 illustrates an example table 400 (e.g., a data structure 245) comprising one or more entries 450, each comprising a plurality of fields such as a packet ID field 410 and a successful attempts value field 420.

In addition, assuming the receiving device is not the destination device, then each time the device attempts to transmit (forward) the particular packet 300 to the next-hop device toward the destination, a transmission attempts value 318 may also be incremented. As noted, this number indicates the number of times the node successfully received the packet (if an intermediate node), and attempted to forward it to the specific next-hop device. It should be noted that the fact that the same message has been received multiple time is an indication of a failure of the uplink (parent) nodes to deliver the message to its destination. The transmission attempts value may be stored as a data structure (e.g., "245a"), such as a similar table to table 400 of FIG. 4 where field 420 is replaced with the transmission attempts value.

As mentioned above, two possible implementations are presented herein regarding where the reachability rate is computed, i.e., at the receiver or at the transmitter. The determination of whether the first or second implementation should be used can be negotiated between the sending and receiving nodes, configured for each node, or configured globally in the whole network 100. For instance, the determination as to which method should be used may be dynamically governed by the computation power of each node and/or by the memory each node has, as well as other factors.

According to the first implementation, it is the receiving node that computes the reachability rate (e.g., the ETX metric) for the incoming link, and provides it back to its upstream neighbor (i.e., the node from which the particular packets are received, not necessarily in relation to a directional orientation within a DAG or other network structure). In this embodiment, the packets 300 contain the transmitted attempts value 318, and the receiver may retrieve a cache entry (field 420, illustrated in FIG. 4) associated with the particular identified packet to compute a new success/failure rate based on the most recent transmitted attempts value 318 and the current stored successful attempts value 420. That is, the reachability rate of a link from the transmitter to the receiver may be determined based on comparing the associated transmission attempts value to the stored successful attempts value. Specifically for determining the ETX, this determination includes dividing the associated transmission attempts value by the stored successful attempts value.

In this embodiment, the receiving device transmits the reachability rate to the transmitter, such as using a specific type-length-value (TLV) field in DAO packets (since they travel back in the direction of the DAG root), or else piggybacked on other existing flows, especially if they have bi-directional traffic, notably allowing the reachability rate to be computed in both directions. In other embodiments, an explicitly returned packet may be used to transmit the computed reachability rate information to the transmitter, but such embodiments are not as efficient (in terms of control traffic overhead) than piggybacking the information.

Note also that in this embodiment, when the receiver forwards the particular packet 300 to a subsequent next-hop device, the forwarded particular packet would then carry the stored successful attempts value 420 as an updated associated transmission attempts value 318 within the forwarded particular packet. In other words, assuming that the receiver forwards the packet each time it receives the packet, the transmitted attempts value (245a) which is included in outgoing packets (in field 318) and the stored successful attempts value (420) should be the same.

For the alternate embodiment mentioned above, the receiving device merely updates its successful attempts value 420, and occasionally transmits it to the transmitter (e.g., along with a packet ID or other identifying feature in order to allow correlation). Accordingly, upon receiving a stored successful attempts value indicative of a number of times the next-hop device has received the same particular packet from the transmitter, the transmitter may then determine the reachability rate to that next-hop receiver device in a similar manner as described above, based on correlating the number of times the receiver received the packet to the number of times the transmitter transmitted that packet.

Figure 5A:
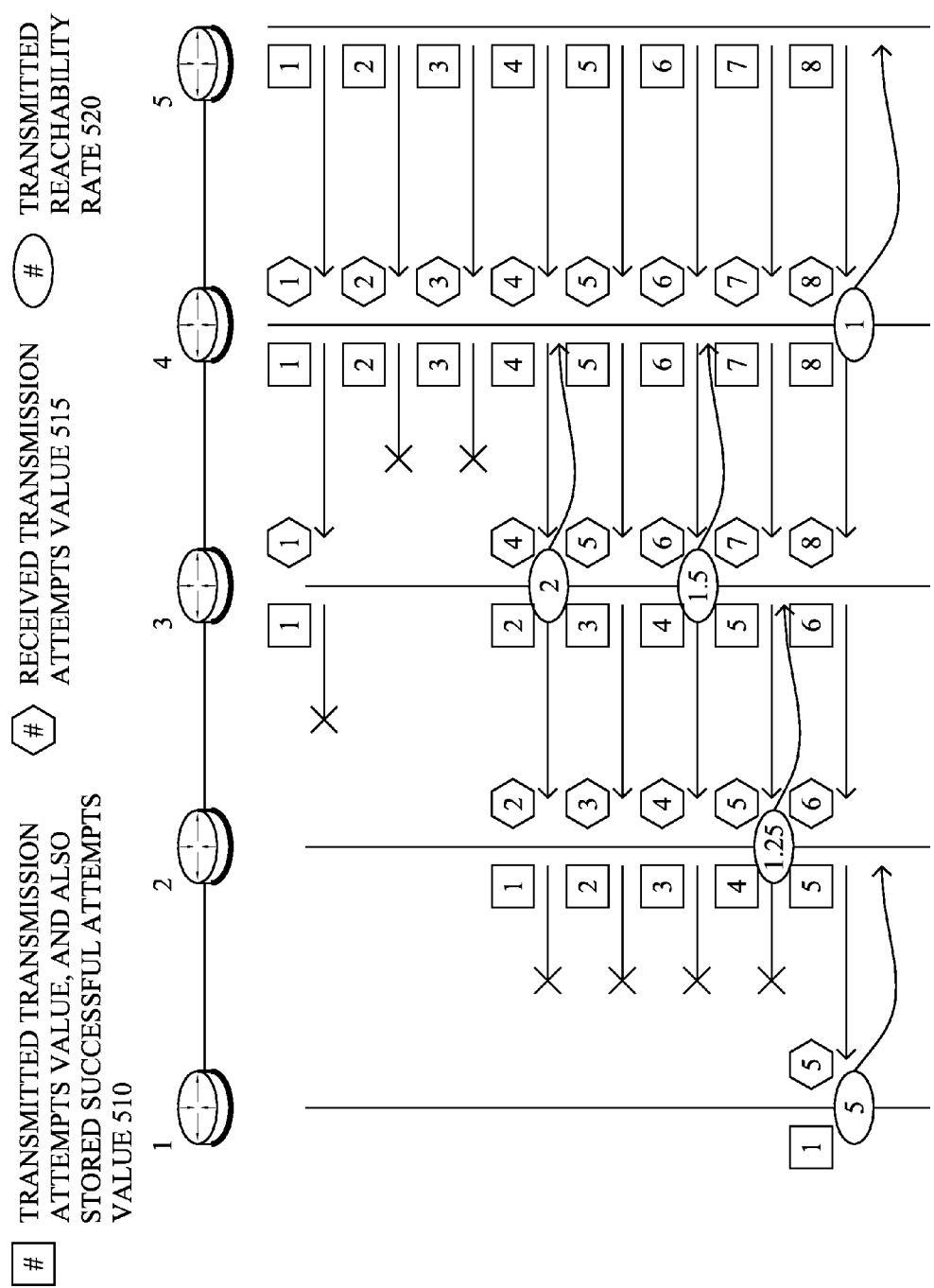
FIGS. 5A-5B illustrate example measurements of reachability rate.
Figure 5B:
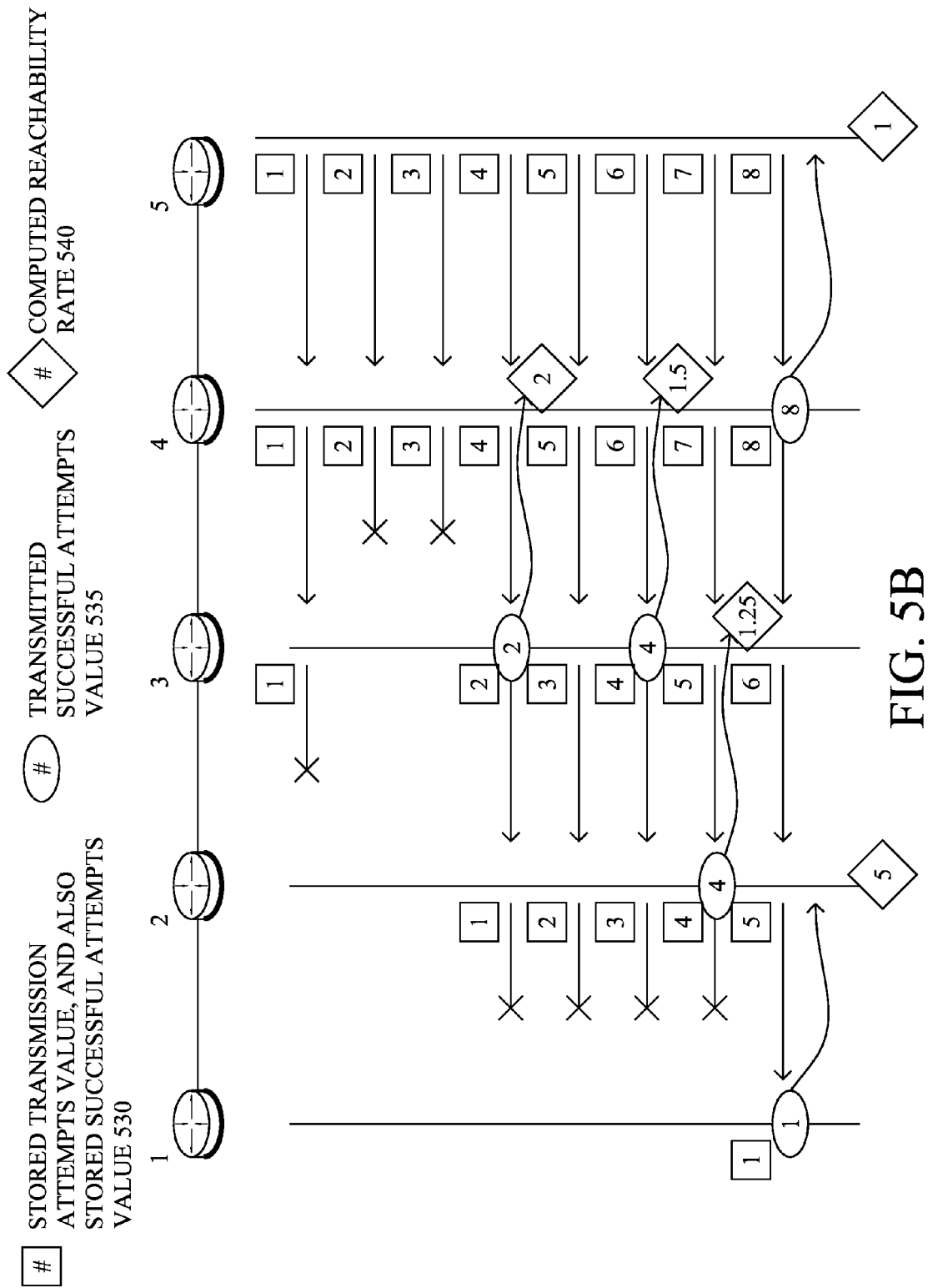

A detailed example of these embodiments is shown in FIGS. 5A and 5B, particularly where FIG. 5A illustrates the instance where the receiver computes the reachability rate, and where FIG. 5B illustrates the instance where the transmitter computes the reachability rate. Essentially, each of FIG. 5A and FIG. 5B assume that node 5 attempts to send an uplink message to node 1 (e.g., a root node in a DAG). In accordance with this specific example scenario, it takes eight attempts for the message (particular packet 300) to reach its destination and then be acknowledged that it was received (e.g., at the application layer). Node 5 thus knows that it took eight attempts for it to send the message via the uplink path, but the information desired herein is the reachability rate measurement (e.g., ETX) for the link between node 5 and node 4. Where a transmission fails across a particular link, an "X" appears in the figure, such that the next retransmission occurs at a subsequent (below) line, accordingly (e.g., after node 5 has not received an application layer acknowledgment after some certain configured time).

As shown in FIG. 5A, a message 300 is sent eight times uplink from node 5 to the root node 1. The transmission attempts values are shown for each packet in black numbers in squares 510 (also indicating the stored successful attempts values at the devices once updated), while the received transmission attempts values are shown in white numbers in squares 515 (which should be the same as the transmitted value at any given transmission attempt, unless the packet is not received). The circles show the computed value of the reachability rate (e.g., ETX) 520 that is provided to the neighbor from which the packet was received (e.g., the upstream neighbor). Note that this example shows a few computed/reported reachability rates, but as discussed earlier an implementation may decide to provide the new reachability rate values when crossing some configurable thresholds, every certain number of packets, etc.

Specifically, in FIG. 5A, the first packet attempt is shown failing on the node 3 to node 2 link. Failing to receive an application layer acknowledgment, node 5 retransmits the packet, which now fails to reach node 3, and the same occurs for a following retransmission. At this time, node 5 has transmitted the packet three times, node 4 has received and transmitted the packet three times, and node 3 has seen it and transmitted it once. As of yet, there are no discrepancies between the number of times a node has received the packet (transmitted transmission attempts value 510 and received transmission attempts value 515). During the next (fourth) transmission, however, once node 3 receives the packet, it can determine that this transmission indicates lost packets on the node 4 to node 3 communication link. As such, in one embodiment, node 3 may compute the reachability rate 520 (e.g., ETX 2) and return it to node 4.

The retransmission continues, and reachability rates 520 may be computed and returned based on any number of configured triggers. For example, as shown in FIG. 5A, node 3 may send the information to node 4 immediately after it receives the second message, thus allowing node 4 to calculate a momentary reachability rate for the link, e.g., ETX=(4 messages sent)/(2 messages received)=4/2=2. However, node 2 may wait until a certain number of packets, or else in response to an expiration of a timer (e.g., from the first received packet, without refreshing the timer upon receiving another of the same packet). Determining the reachability rate and/or transmitting the reachability rate may thus each be in response to a specified trigger, such as, e.g., a crossed reachability rate threshold, a number of received packets, an updated reachability rate, an expiration of a timer, etc.

The reachability rate may thus also be updated as of later transmissions using either the same trigger or a different trigger. For example, node 3 may later return an updated ETX of 1.5 based on the same particular packet as shown. Alternatively, a node may use other particular packets received. Said differently, since the reachability rates are link-specific, not packet-specific, a node may use values from multiple particular packet retransmissions. For example, assume that a packet "A" is received 1 of 4 times (ETX 4), and a packet "B" is received 3 of 4 times (ETX 1.33). According to embodiments that combine different particular packets, the computed reachability rate could be based on receiving 4 of 8 expected packets, i.e., an ETX of 2. Had the two individually computed ETXs been combined by simple averages, for example, an ETX of 2.66 would have resulted, which is not entirely precise for the link as a whole (factors may contribute to the different ETX values, such as different packet sizes).

Returning to the example of FIG. 5A, by the time node 1, the destination node, receives the particular packet, it can determine that it is the fifth time node 2 has transmitted the packet, and hence can determine a reachability rate of ETX=5 (5/1). Similarly, node 4, which no longer receives the particular packet at this point, may determine (e.g., after a timer expiring since the last received particular packet) that its link's reachability rate is 100% reachable, i.e., ETX=1 (8/8).

Referring now to the second embodiment as shown in FIG. 5B, instead of computing the reachability rate, the receiving nodes may instead simply return their stored successful attempts values, such that the transmitters may compute the reachability rate. For instance, the stored successful (or transmission) attempts values are shown as boxes 530, while any returned values are shown as circles 535, and resultantly computed reachability values are shown as diamonds 540. For example, in this embodiment, node 3 sends a message to node 4 informing it that node 3 has seen two copies of the particular packet (e.g., a particular packet ID, which is included in the returned message to node 4 for correlation purposes). Node 4 receives this message, and based on its own stored transmission attempts value for that particular identified packet can determine that, based on having sent the particular packet four times, the reachability rate for the node 4 to node 3 link is ETX=2 (4/2).

Note that the returned values may again be returned based on various timers, packet counts, etc., and may be returned as piggybacked information or as an explicit message. The fact that FIG. 5A and FIG. 5B illustrate the same information return timing is merely to demonstrate the different values that would be returned, and is not meant to limit the scope of the embodiments herein. In fact, it may be beneficial to report stored successful attempts values (FIG. 5B) more often than computer reachability rates (FIG. 5A), since the receivers in the second embodiment (FIG. 5B) are unaware of the actual number of times a packet has been retransmitted in order to reach the receiver.

Figure 6:
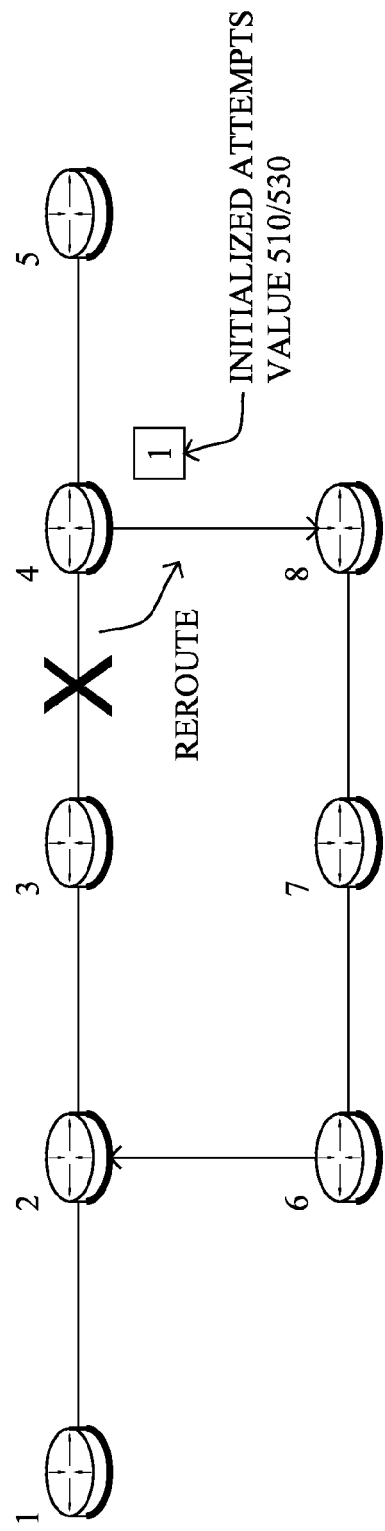
FIG. 6 illustrates an example measurement of reachability rate in the event of a rerouted path.

It is important to point out that a packet 300 may often be retransmitted over an alternate path due to failure of a link, etc. For example, as shown in FIG. 6, assume that node 4 determines that a backup path through node 8 (and thus through 7 and 6) may be used (replacing the original path via node 3) in response to various factors understood in the art. In this instance, in response to rerouting the particular packet to a backup next-hop device, the transmitting node (node 4) initializes the associated transmission attempts value for the particular packet (e.g., the packet ID) that is now being forwarded to node 8, so that the nodes would be able to compute the reachability rate (e.g., ETX) specific to their link.

Figure 7A:
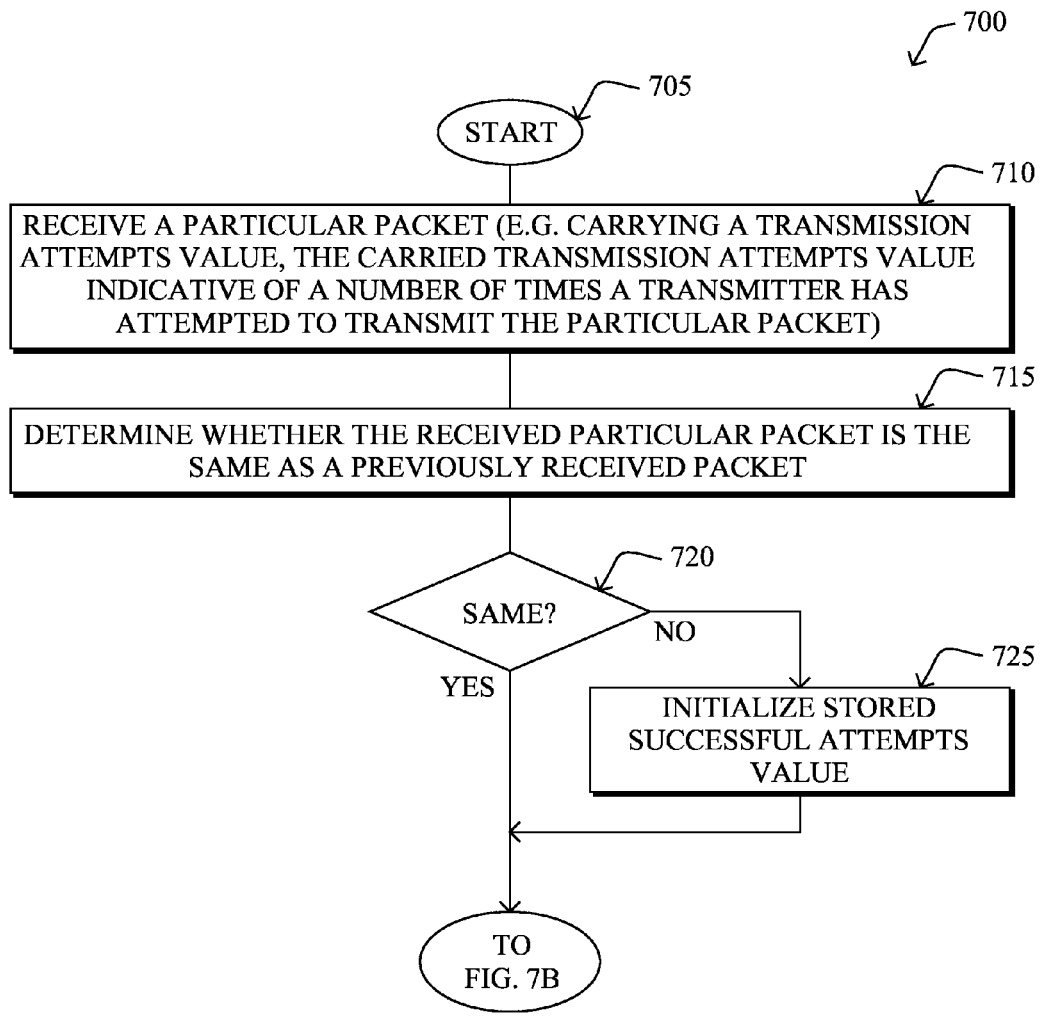
FIGS. 7A-B illustrate an example simplified procedure for providing for reachability rate computation (e.g., ETX) without link layer acknowledgments.
Figure 7B:
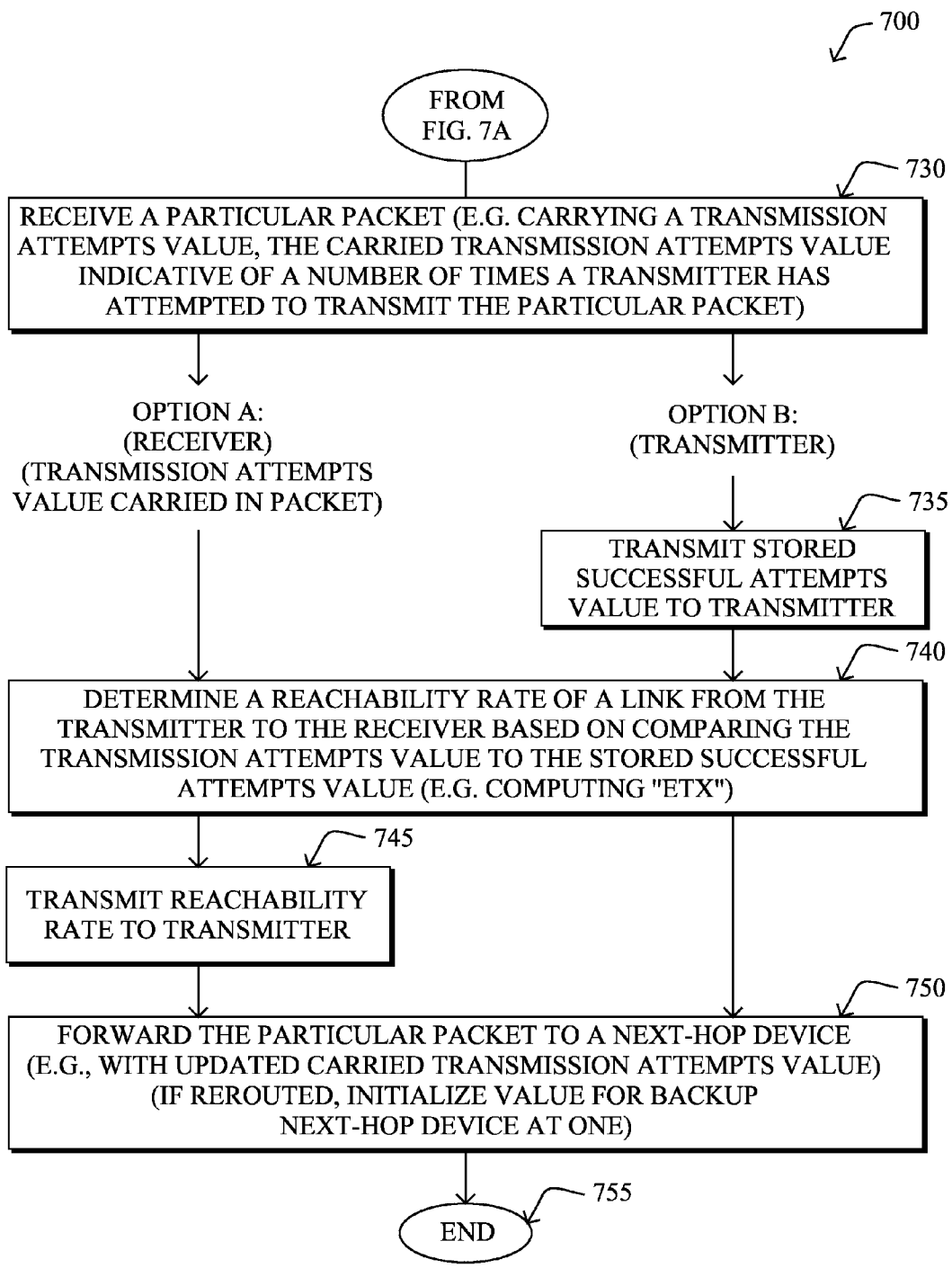

FIGS. 7A-B illustrate an example simplified procedure for providing for reachability rate computation (e.g., ETX) without link layer acknowledgments in accordance with one or more embodiments described herein. The procedure 700 starts at step 705, and continues to step 710, where a receiving node (e.g., node 4) receives a particular packet 300. Note that in certain embodiments as described above, this packet 300 may be carrying a transmission attempts value 318, indicative of a number of times a transmitter (e.g., node 5) has attempted to transmit the particular packet. In step 715, the receiving node may then determine whether the received particular packet 300 is the same as a previously received packet, as described in detail above.

If in step 720 the packet is not the same as a previously received packet, i.e., it is the first time the receiving device is receiving the packet, then in step 725 the receiving device may initialize a stored successful attempts value 420 for the particular packet (e.g., based on its packet ID). If, on the other hand, in step 720 the packet is the same, i.e., is a retransmission of a previously received packet, then, continuing to FIG. 7B, in step 730 the receiving device increases by one the stored successful attempts value 420, which is indicative of a number of times the receiver has received the same particular packet and have sent it uplink.

As noted above, two embodiments described herein, shown in FIG. 7 as "Option A" and "Option B", may then be implemented to calculate the reachability rate. For instance, in Option B, in which the transmitter is to calculate the reachability rate, then in step 735 the receiver sends its stored successful attempts value (an entry in field 420 corresponding to the particular packet 300) to the transmitter. As such, in step 740, the transmitter may then determine a corresponding reachability rate of a link from the transmitter to the receiver based on comparing the transmission attempts value (here, stored at the transmitter, 245*a*) to the stored successful attempts value received from the receiver.

Alternatively, following the "Option A" embodiment, where the receiver is to calculate the reachability rate and where the transmission attempts value 318 is carried in the packet 300, then in step 740 the receiver may determine the reachability rate of the link from the transmitter to the receiver based on comparing the transmission attempts value (carried in the packets) to its stored successful attempts value 420. Upon determining the reachability rate, the receiver may then, in step 745, transmit the rate to the transmitter, e.g., as an explicitly returned packet, a field within a DAO message, or piggybacked in another type of returned packet.

In step 750, assuming the receiver is not the destination node of the packet, then the receiver forwards the particular packet 300 to a next-hop device, e.g., node 3. Note that the forwarded packet may contain an updated carried transmission attempts value 318 based generally on the stored successful attempts value at the receiver (i.e., the number of times a receiver receives a packet should generally be the number of times a receiver attempts to transmit/forward that packet. Note also that, as described above, if the packet needs to be rerouted along a secondary/backup path, then the receiver (now "forwarder") may initialize the transmission attempts value, as it is the first time transmitting to this new node.

The procedure 700 illustratively ends in step 755, though may actually recursively continue to receive additional packets, and hence may return to step 710 to receive additional packets to be processed. It should be noted that procedure 700 is merely an example for illustration, and is not meant to be limiting to the scope of the embodiments herein. For instance, while certain steps within the procedure 700 may be optional as described above, certain steps may be included or excluded as desired, and the steps may also be in a different order that what is shown where suitable. For example, the packet may first be forwarded in step 750 immediately after step 710, performing any analysis or measurement within steps 715-745 after forwarding the packet in order to minimize transmission delay of the packet. Accordingly, the location of step 750 is not meant to limit the scope of the embodiments herein, and is merely illustrative.

The novel techniques described herein, therefore, provide for reachability rate computation (e.g., ETX) without link layer acknowledgments in a computer network. In particular, the techniques herein provide an efficient low cost mechanism to compute the link reachability rate (e.g., ETX) metrics, even in the presence of links that do not provide acknowledgment, Additionally, the techniques may accomplish this by observing existing traffic flows, without requiring additional control plane overhead, which is a critical feature for LLNs such as smart grid networks (e.g., AMI).

While there have been shown and described illustrative embodiments that provide for reachability rate computation without link layer acknowledgments in a computer network, it is to be understood that various other adaptations and modifications may be made within the spirit and scope of the embodiments herein. For example, the embodiments have been shown and described herein with relation to LLNs, and more particularly, to the RPL protocol. However, the embodiments in their broader sense are not as limited, and may, in fact, be used with other types of networks and/or protocols. Also, while the techniques described above generally reference wireless communication, other shared media (e.g., PLC) may be used. In addition, while the reachability rate is generally described as an ETX, other reachability rates that are based on comparing the associated transmission attempts value to the stored successful attempts value, as noted herein, such as a success rate, failure rate, or other measurement indicative of a reachability between two nodes based on how many packets are received in comparison to how many were attempted.

Moreover, while the above description generally describes measuring reachability rate based on any particular packet 300 transmitted, the embodiments herein are not so limited, and may include other triggers/rates for determining the reachability rate. For example, determining the reachability rate may occur at a rate such as, e.g., at each received particular packet (as described above), at each received particular packet that is a particular type of packet (e.g., priority, type, class, etc.), at each received particular packet that has the associated transmission attempts value field 318, and at a select periodicity of packets (e.g., every other particular packet, every other hour/day/etc., in response to specific requests occasionally sent into the network to update reachability rate information, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at a device in a computer network, a particular packet associated with a transmission attempts value, the associated transmission attempts value indicative of a first number of times a transmitter has attempted to transmit the particular packet;
    in response, increasing by one a stored successful attempts value stored at the device, the stored successful attempts value indicative of a second number of times the device has received the same particular packet; and
    determining a reachability rate of a link from the transmitter to the device based on comparing the associated transmission attempts value to the stored successful attempts value.

2. The method as in claim 1, further comprising:
    determining whether the received particular packet is the same as a previously received packet based on a packet identification.

3. The method as in claim 2, wherein the packet identification is selected from a group consisting of: an explicit packet identifier value; and a computed identification of the packet, the computed identification further selected from a second group consisting of: a hash result of the packet; a checksum of the packet; and a direct comparison between the received particular packet and the previously received packet.

4. The method as in claim 2, further comprising:
    determining that the received particular packet is not the same as a previously received packet; and
    in response, initializing the stored successful attempts value at one.

5. The method as in claim 1, wherein the reachability rate is an expected transmission count (ETX) value, the step of determining comprising:
    dividing the associated transmission attempts value by the stored successful attempts value to determine the ETX.

6. The method as in claim 1, wherein the associated transmission attempts value is carried within the particular packet, the method further comprising:
    forwarding the particular packet to a next-hop device, the forwarded particular packet having the stored successful attempts value from the device as an updated associated transmission attempts value carried within the forwarded particular packet.

7. The method as in claim 6, further comprising:
    in response to rerouting the particular packet to a backup next-hop device, initializing the associated transmission attempts value within the forwarded particular packet at one.

8. The method as in claim 1, wherein the associated transmission attempts value is carried within the particular packet, and wherein determining the reachability rate occurs at the device, the method further comprising:
    transmitting the reachability rate to the transmitter.

9. The method as in claim 8, wherein at least one of determining the reachability rate and transmitting the reachability rate is in response to a trigger selected from a group consisting of: a crossed reachability rate threshold; a number of received packets; an updated reachability rate; and expiration of a timer.

10. The method as in claim 1, wherein determining the reachability rate occurs at a rate selected from a group consisting of: at each received particular packet; at each received particular packet that is a particular type of packet; at each received particular packet that has the associated transmission attempts value; and at a select periodicity of packets.

11. The method as in claim 1, further comprising:
transmitting the stored successful attempts value to the transmitter; and
wherein determining the reachability rate occurs at the transmitter.

12. An apparatus, comprising:
one or more network interfaces to communicate in a computer network;
a processor coupled to the network interfaces and adapted to execute one or more processes; and
a memory configured to store a process executable by the processor, the process when executed operable to:
receive a particular packet carrying a transmission attempts value, the associated transmission attempts value indicative of a first number of times a transmitter has attempted to transmit the particular packet;
in response, increase by one a stored successful attempts value, the stored successful attempts value indicative of a second number of times the process has received the same particular packet; and
determine a reachability rate of a link from the transmitter to the network interfaces based on comparing the associated transmission attempts value to the stored successful attempts value.

13. The apparatus as in claim 12, wherein the process when executed is further operable to:
determine whether the received particular packet is the same as a previously received packet based on a packet identification.

14. The apparatus as in claim 13, wherein the packet identification is selected from a group consisting of: an explicit packet identifier value; and a computed identification of the packet, the computed identification further selected from a second group consisting of: a hash result of the packet; a checksum of the packet; and a direct comparison between the received particular packet and the previously received packet.

15. The apparatus as in claim 13, wherein the process when executed is further operable to:
determine that the received particular packet is not the same as a previously received packet; and
in response, initialize the stored successful attempts value at one.

16. The apparatus as in claim 12, wherein the reachability rate is an expected transmission count (ETX) value, wherein the process when executed to determine is further operable to:
divide the associated transmission attempts value by the stored successful attempts value to determine the ETX.

17. The apparatus as in claim 12, wherein the process when executed is further operable to:
forward the particular packet to a next-hop device, the forwarded particular packet having the stored successful attempts value from the apparatus as an updated associated transmission attempts value within the forwarded particular packet.

18. The apparatus as in claim 12, wherein the process when executed is further operable to:
transmit the reachability rate to the transmitter.

19. A method, comprising:
transmitting, from a transmitter device, a particular packet to a next-hop device in a computer network, the particular packet associated with a transmission attempts value, the associated transmission attempts value indicative of a first number of times the transmitter has attempted to transmit the particular packet;
receiving, at the transmitter from the next-hop device, a stored successful attempts value indicative of a second number of times the next-hop device has received the same particular packet from the transmitter; and
determining a reachability rate of a link from the transmitter to the next-hop device based on comparing the associated transmission attempts value to the stored successful attempts value.

20. The method as in claim 19, wherein the reachability rate is an expected transmission count (ETX) value, the step of determining comprising:
dividing the associated transmission attempts value by the stored successful attempts value to determine the ETX.

* * * * *

UNITED STATES PATENT AND TRADEMARK OFFICE
CERTIFICATE OF CORRECTION

| | | |
|---|---|---|
| PATENT NO. | : 8,885,501 B2 | Page 1 of 1 |
| APPLICATION NO. | : 13/151062 | |
| DATED | : November 11, 2014 | |
| INVENTOR(S) | : Vasseur et al. | |

It is certified that error appears in the above-identified patent and that said Letters Patent is hereby corrected as shown below:

In the Specification

In column 4, line 12, please replace:
  "Intennediate" with "Intermediate"

Signed and Sealed this
Eighth Day of September, 2015

Michelle K. Lee
*Director of the United States Patent and Trademark Office*